United States Patent Office 3,839,410
Patented Oct. 1, 1974

3,839,410
1-ESTERS OF 3-ORGANOSULFONYL-2-AZA-SUCCINIC ACID AND BASE ADDITION SALTS THEREOF
Steffen Piesch, Oberursel, Taunus, Friedrich Engelhardt and Erwin Herrmann, Frankfurt am Main-Fechenheim, and Dieter Plath, Bischofsheim, Germany, assignors to Cassella Farbwerke Mainkur Aktiengesellschaft, Frankfurt am Main-Fechenheim, Germany
No Drawing. Filed June 2, 1972, Ser. No. 259,040
Claims priority, application Germany, June 5, 1971,
P 21 28 010.4
Int. Cl. C07c 69/74, 147/06
U.S. Cl. 260—468 E                      6 Claims

ABSTRACT OF THE DISCLOSURE

Compounds of the formula

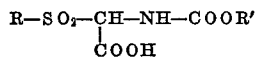

and their base addition salts wherein R and R' are alkyl, cycloalkyl, alkenyl, alkinyl, aryl, aralkyl or heteroaryl radicals useful as the reducing component in a Redox catalyst system of the type employed for the polymerization of olefinically unsaturated monomers.

---

This invention relates to compounds selected from the group consisting of those of the formula

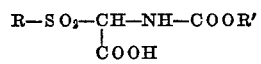   I and their base addition salts wherein R and R' are alkyl having 1 to 6 carbon atoms, cycloalkyl having 3 to 8 carbon atoms, alkenyl having 2 to 6 carbon atoms, alkinyl having 2 to 6 carbon atoms, phenyl, naphthyl, benzyl, phenethyl, phenpropyl, phenoxyethyl, thienyl, pyrrolyl, pyridyl or one of said moieties substituted by alkyl or alkoxy having 1 to 4 carbon atoms, alkenyl or alkinyl having 2 to 4 carbon atoms, chlorine, bromine, fluorine, cyano, nitro, hydroxy, carboxy, trifluoromethyl, trifluoromethyloxy or —NHCO—R" wherein R" is hydrogen, alkyl having 1 to 4 carbon atoms in said alkyl moiety, phenoxy or phenoxyalkyl having 1 to 4 carbon atoms in said alkyl moiety.

The base addition salts of the present invention include those wherein the cations may be either inorganic or organic. The preferred inorganic salts are those wherein the cations are of the first and second main group of the Periodic Table. Of these, the ammonium, lithium, sodium, potassium, calcium and copper salts are most preferred. The preferred organic cations are those derived from organic bases such as trimethylamine, triethylamine, triethanolamine, morpholine, piperidine, brucine, pyrrolidine and aniline.

The novel compounds of formula I may be prepared according to the following methods:

METHOD A

A sulfinic acid of formula II is reacted with glyoxylic acid (OCHCOOH) in a suitable solvent to obtain an oxysulfonyl acetic acid of formula III.

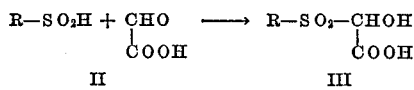

The oxysulfonyl acetic acid of formula III, after isolation if necessary, is then reacted with a carbamic acid ester of formula IV to obtain compound I.

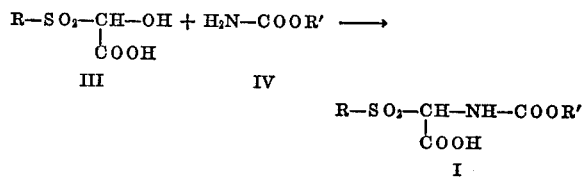

The oxysulfonyl acetic acids of formula III are in general not particularly thermally stable, so that it is normally not advisable to exceed reaction temperatures of 50° C.

METHOD B

A sulfinic acid of formula II, glyoxylic acid and a carbamic acid ester of formula IV are reacted in a suitable solvent:

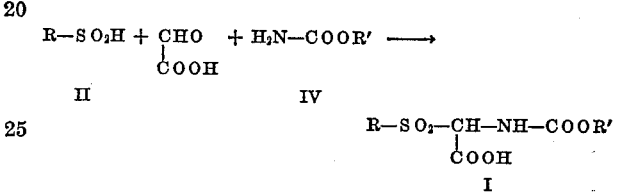

The preferred solvent in this connection is acetic acid, formic acid, alkanols having 1 to 4 carbon atoms, water, dimethylformamide, dimethylsulfoxide or a solvent mixture, particularly a mixture of two or more of the aforesaid solvents. Normally, the three components, sulfinic acid, glyoxylic acid and carbamic acid ester, are stirred in the solvent at temperatures between 5 and 100° C. The sulfinic acid may, for example, be used in the form of a salt, preferably its potassium or sodium salt. After some time, the novel compounds precipitate as crystals. After their isolation, they may be recrystallized from a suitable solvent.

This process generally produces good yields. However, in some instances, it proceeds unsatisfactorily. This is particularly true when the reaction between the compound of formula III, which is formed as an intermediate in this method, and the carbamic acid ester proceeds so slowly that the compound of formula III begins to decompose at the reaction temperature.

METHOD C

A carbamic acid ester of formula IV is first reacted with glyoxylic acid to obtain a compound of formula V.

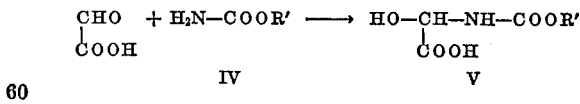

This reaction is also carried out in a suitable solvent or solvent mixture. Suitable solvents, for example, include water, acetic acid, formic acid, ethylene chloride, dimethylformamide, dimethylsulfoxide, alkanols having 1 to 4 carbon atoms and mixtures thereof.

Rather drastic reaction requirements may be selected. For example, temperatures of up to 150° C. and above may be employed, so that even carbamic acid esters of formula IV which are difficult to dissolve and/or slow to react may be converted.

Subsequently, compound V, after its isolation if necessary, is reacted with a sulfinic acid of formula II in a suitable solvent under mild reaction conditions.

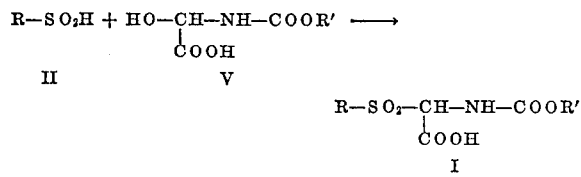

Suitable solvents, for example, include water alkanols having 1 to 4 carbon atoms, formic acid, acetic acid, dimethylformamide, dimethylsulfoxide and mixtures thereof. The reaction temperatures for the reaction of compound V with the sulfinic acid are normally between 0 and 80° C.

In both Methods A and C, the sulfinic acid II may be used in thhe form of a salt. With the three Methods A, B and C, the glyoxylic acid also may be used in the form of a salt, e.g. the sodium, calcium, triethylammonium, triethanolammonium or potassium salt. In addition, in certain instances, the aldehyde group may also be acetalized.

As the sulfinic acids or their salts, one may employ, for example, methane-, propane-, butane-, benzene-, p-toluene-, p-chlorobenzene-, 4-methoxybenzene-, 3-trifluoromethylbenzene-, 4-nitrobenzene-, 3-cyanobenzene-, 4-acetaminobenzene-, 3,4-dichloro-, 2,5-dichloro- or 2,6-dichlorobenzene-, 2,3,4 - trichlorobenzene-, 2,5-dimethoxybenzene-, 3,4,5-trimethoxybenzene-, 2-methoxy-5-chlorobenzene-, 2-chloro-5-nitrobenzene-, 2-chloro-5-trifluoromethylbenzene-, 2-chloro-6-methylbenzene-, 2-thiophene- or 2-naphthalene-sulfinic acid.

Those sulfinic acids II and carbamic acid esters IV which are needed as starting compounds and are not known, may be prepared according to processes known per se.

The sulfinic acids may be obtained, for example, either by the reduction of the corresponding sulfochlorides (these in turn are obtainable by the reaction of the corresponding substituted parent compound with chlorosulfonic acid or from the corresponding substituted arylamine by a modified Sandmeyer reaction according to Meerwein— Chem. Ber., Vol. 90, p. 841 (1957)) or by a direct Sandmeyer reaction to the sulfinic acid. In this way, for example, the new compound 2-chloro-6-methylbenzene sulfinic acid (melting point 110° C.) with decomposition was prepared from 2-chloro-6-methylaniline via 2-chloro-6-methylbenzene sulfochloride (boiling point—117° C. at 1.3 mm.). The preparation of sulfinic acids is described in summary in Houben-Weyl, Methoden der organischen Chemie, Vol. IX (1955), p. 299 et seq.

As carbamic acid esters (urethanes also mentioned), one may employ, for example, methyl-, allyl-, n-butyl-, phenyl-, benzyl-, 4-methoxybenzyl-, cyclohexyl-, 3-phenylpropyl-, propinyl-, phenoxyethylcarbamate and others. Carbamic acid esters may be easily prepared from the corresponding alcohols and urea or from the corresponding chloroformic acid esters and ammonia.

From the compounds of formula I, the salts may be prepared in a manner known per se by the reaction with inorganic or organic bases.

The novel compounds of formula I and their salts are particularly suitable as reducing components in Redox catalyst systems of the type employed for the preparation of homopolymers and copolymers of olefinic unsaturated compounds. They may also be used in plant protection, e.g. as herbicides and as pharmaceuticals.

In the following examples, "(Z)" means with decomposition.

Example 1 (Method B)

Methylcarbamate (7.5 g.), 17.8 g. of the sodium salt of p-toluene sulfinic acid, 26 g. 40% glyoxylic acid in water, 100 ml. water and 20 g. 85% formic acid are stirred for 5 hours at 40° C. After 2 hours, the solution becomes turbid as a result of the reaction product beginning to crystallize. Upon completion of the reaction, the composition is cooled to 10° C., decanted and washed with ice water. After drying by way of phosphorus pentoxide, 29.5 g. (76% of the theoretical) of the 1-methyl ester of 3-(p-tolylsulfonyl)-2-aza-succinic acid having a melting point of 101° C. in the racemic form are obtained. With optically active bases, this compound may be separated into its optical antipodes. With triethylamine in alcohol, triethylammonium salt was prepared having a melting point of 90° C. (Z). This has outstanding solubility in both water as well as in organic solvents such as chloroform, acetic acid ethylester, ethyl alcohol and dimethylformamide.

The preparation of further salts of the 1-methyl ester of 3-(p-tolylsulfonyl)-2-aza-succinic acid is as follows:

Lithium salt: The acid is dissolved in water at 20° C. and neutralized with lithium carbonate. It is dried by means of phosphorus pentoxide at 20° C. Obtained is a colorless lithium salt, preponderantly soluble in water, having a melting point of 190° C. (Z). In a similar manner, one may prepare sodium and potassium salts with the use of sodium or potassium carbonate.

Copper salt: 14.3 g. (50 mmol) of the acid are dissolved in 200 ml. water at 70° C. There are added 100 ml. of a cold saturated solution of cupric acetate in water. The composition is cooled to 20° C. and upon standing overnight the copper salt, difficultly soluble in water, is recovered. The yellow-green crystals which are obtained decompose without melting above 150° C.

Aniline salt: 14.3 g. (50 mmol) of the acid are dissolved in 150 ml. isopropanol. While stirring at room temperature, there are added dropwise 6 g. aniline (60 mmol) dissolved in 40 ml. isopropanol. After stirring for 3 hours, the aniline salt (17 g.–90% of the theoretical) is drawn off and washed with ether. Colorless crystals having a melting point of 180° C. (Z) are obtained.

Example 2 (Method A)

The sodium salt of 3,4-dichlorobenzene sulfinic acid (24 g.) is dissolved in 70 ml. water and 50 ml. 85% formic acid at 60° C. The composition is cooled to 20° C. and 26 g. 40% glyoxylic acid in water are added. This mixture is stirred for 3 hours at 30° C. and then 12 g. n-butylcarbamate are added and the resulting mixture is stirred for another 5 hours at 20–30° C. It is cooled to 0° C. and after standing overnight, the resulting crystals are removed and washed with ice water. The product may be recrystallized with isopropanol. Obtained are 26 g. (70% of the theoretical) of the 1-butyl ester of 3-(3,4-dichlorophenylsulfonyl)-2-aza-succinic acid having a melting point of 118° C. (Z).

Example 3 (Method C)

Phenylcarbamate (13.7 g.), 26 g. 40% glyoxylic acid in water and 50 ml. water are stirred at 85° C. for 5 hours. There results a clear solution. It is cooled to 40° C. and there is added, while stirring, a solution of 18 g. of the sodium salt of p-toluene sulfinic acid in 60 ml. water and 30 ml. 85% formic acid. After an additional 6-hour stirring at 40° C., the product crystallizes out. It is cooled to 0° C. in order to complete the crystallization. Obtained are 22.2 g. (64% of the theoretical) of the 1-phenyl ester of 3-(p-tolylsulfonyl)-2-aza-succinic acid having a melting point of 192° C. (Z) in the racemic form.

Compounds of the indicated formula are prepared analogously.

$$\text{R—SO}_2\text{—CH—NH—COOR'}$$
$$\hspace{2.2cm}|$$
$$\hspace{1.7cm}\text{COOH}$$

| R | R' | Melting point (°C.) | Method |
|---|---|---|---|
| 2,3-Cl₂-C₆H₃— | —CH₃ | 128° | C, B |
| 2,5-(OCH₃)₂-C₆H₃— | —CH₃ | 145° (Z) | C |
| 2,5-Cl₂-C₆H₃— | —C₆H₅ (H) | 176° | C |
| Cl-C₆H₄— | Same as above | 196° | C |
| CH₃-C₆H₄— | —CH₂-C₆H₄-Cl | 220° (Z) | C |
| 2,3-Cl₂-C₆H₃— | —CH₂-C₆H₄-OCH₃ | 160° | A, C |
| 2-Cl-3-CH₃-C₆H₃— | —CH₃ | 160° (Z) | C |
| CF₃-C₆H₄— | —CH₂—CH₂—CH₂-C₆H₅ | 220° (Z) | A |
| Cl-C₆H₄— | —CH₂-C₆H₄-OCH₃ | 158° | B, C |
| 2,3-Cl₂-C₆H₃— | —CH₂—CH₂—OH | 118° (Z) | C |
| CH₃-C₆H₄— | —CH₂—CH₂—OC₆H₅ | 258° (Z) | A, C |
| 2-Cl-4-OCH₃-C₆H₃— | —CH₃ | 120° (Z) | A |
| Cl-C₆H₄— | —CH₃ | 182° | A |
| 2-NO₂-4-Cl-C₆H₃— | —CH₃ | 185° | A, C |
| CH₃-CO-NH-C₆H₄— | —CH₃ | 152° (Z) | C |
| O₂N-C₆H₄— | n-C₄H₉ | 118° (Z) | C |
| NC-C₆H₄— | —CH₂-C₆H₅ | 144° (Z) | C |

TABLE—Continued

| R | R' | Melting point (°C.) | Method |
|---|---|---|---|
| 2,4,5-trichlorophenyl | —CH₃ | 160° (Z) | C |
| naphthyl | —CH₃ | 185° (Z) | C |
| 4-chloro-2-trifluoromethylphenyl | —CH₂CH₂CH₂—C₆H₅ | 140° (Z) | C |
| 2,6-dimethylphenyl | —CH₂CH₂O—C₆H₄—Cl | 185° (Z) | C |
| 2,5-dimethoxyphenyl | —CH₂CH₂O—C₆H₄—NO₂ | 167° (Z) | C |
| CH₃—CO—NH—C₆H₄— | cyclohexyl (H) | 143° (Z) | A, C |
| 2,5-dichlorophenyl | n-C₄H₉ | 117° (Z) | C |
| 2,6-dichlorophenyl | naphthyl | 180° (Z) | C |
| 4-nitrophenyl | naphthyl | 184° (Z) | C |
| thienyl | —CH₃ | 102° (Z) | C |
| Same as above | —C₆H₅ | 176° (Z) | C |
| C₆H₅— | —CH₃ | 98° (Z) | C |
| C₆H₅— | —CH₂—C₆H₄—OCH₃ | 162° (Z) | C |
| 2,4,6-trimethoxyphenyl | —CH₃ | 108° (Z) | C |
| Same as above | cyclohexyl (H) | 146° (Z) | A, C |
| Do | phenyl | 148° (Z) | C |

TABLE—Continued

| R | R' | Melting point (°C.) | Method |
|---|---|---|---|
| 3,4,5-tri(CH₃O)-C₆H₂— | —CH₂CH₂O—C₆H₄—Cl | 202° (Z) | C |
| CH₃— | —C₆H₅ | 145° (Z) | C |
| C₂H₅— | —C₂H₄—O—C₆H₅ | 140° (Z) | C |
| 2,4-Cl₂-C₆H₃— | —CH₂—CH=CH₂ | 130° (Z) | C |
| 4-CH₃-C₆H₄— | —CH₃ | 105° | C |
| Same as above | —C₆H₅ | 192° (Z) | C |
| 2-Cl-4-F₃C-C₆H₃— | —CH₂—C≡CH | 125° (Z) | C |

As previously indicated, the novel compounds of formula I are particularly suitable as reducing components in Redox catalyst systems of the type used for the preparation of homopolymers and copolymers of olefinically unsaturated compounds.

Suitable monomers for the preparation of these polymers are, for example, acrylic acid, methacrylic acid as well as their salts, esters and amides, styrene, styrene halides such as 2,5-dichlorostyrene, α-methylstyrene, vinyltoluene, allylbenzene, vinylcarbazol, vinylmethylketone, acrylonitrile, vinylidene cyanide, vinylacetate, methylolacrylamide or methacrylamide and their reaction products with amines and alcohols, vinyl pyrrolidone, carbazole esters of unsaturated alcohols such as vinyl acetate, dialkylphthalate, ethylene and propylene.

A compound of formula I is used as the reducing component of the Redox catalyst system. The oxidizing component may be, for example, air, oxygen or an inorganic or an organic per compound such as tertiary butyl peroxide, di-tertiary butyl peroxide, benzoyl peroxide, lauroyl peroxide, acetyl peroxde, propanesulfonyl hydroperoxide, dicyclohexyl percarbonate, cumene hydroperoxide, methylethylketone peroxide, hydrogen peroxide and potassium, sodium and ammonium peroxy disulfate.

The preparation of the polymers may be by precipitation, emulsion, solution or bulk polymerization. The polymerization is carried out in a manner known per se at temperatures between —10 and 120° C., and preferably between 0 and 80° C.

By additions of chloride ions, higher molecular weights and polymer yields are achieved. The concentration of the compound of formula I used preferably amounts to 0.02 to 3% by weight and the concentration of the oxidizing components is preferably 0.25 to 2% by weight based on the monomer or mixture of monomers employed. Of course, it is possible to use a mixture of two or more compounds of formula I as the reducing component of the Redox catalyst system.

With monomer conversions of more than 90%, uniform polymers are obtained having a high molecular weight. Particularly advantageous results are achieved by homo- and copolymerizing acrylamide in aqueous solution as well as by precipitation polymerization thereof from tert. butanol. Homopolymers prepared in this manner surpass the polymers prepared according to known processes by virtue of their water solubility and higher molecular weight. In the polymerization from aqueous solution, non-flowable polymerization gels are obtained, which, even after an extended period of time, retain their shape.

In the use of the novel compounds of formula I as the reducing component in Redox catalyst systems for the preparation of homo- and copolymers of olefinically unsaturated compounds, air suffices in many instances as the oxidizing component, so that further oxidizing agents may be omitted. This is particularly useful in the preparation of protective and/or decorative coatings by the polymerization of thin films of monomeric or oligomeric liquid or dissolved unsaturated compounds and results in the unsaturated compounds yielding polymers in dissolved, steeped or suspended form. For the prepaartion of such protective and/or decorative coatings, one may employ, for example, in monomeric or oligomeric form, styrene, styrene halides, acrylic acid esters or methacrylic acid esters of monohydric or polyhydric alcohols, vinyltoluene, allyl- or methallylesters of polyfunctional carbonic acids, acrylic acid, methacrylic acid, vinyl pyrrolidone, vinyl carbazole, esters of unsaturated alochols such as vinyl acetate, N-vinylmethylacetamide, vinylidene cyanide, vinylmethylketone, acrylonitrile, vinylidene chloride and vinyl ether, if necessary with the addition of polyfunctional, unsaturated compounds as crosslinking agents such as trisaryloylperhydrotriazine or triallylisocyanurate.

Mixtures of two or more olefinically unsaturated compounds may also be used as may mixtures of saturated or unsaturated polyesters on the one hand and olefinically unsaturated monomers on the other hand. As such monomers, styrene, acrylic acid ester, methacrylic acid ester and vinyltoluene are, for example, suitable.

Polymers, which may be obtained from the monomeric or oligomeric starting substances in dissolved, steeped or suspended form are, for example, polymers of styrene, styrene halides, acrylic acid esters, methacrylic acid esters, vinyltoluene, vinylacetate and copolymers thereof.

Polymerization for the preparation of the protective and/or decorative coatings is carried out using the novel compounds of formula I at temperatures between —10 and 120° C., and preferably between 0 and 80° C. The concentration of the compounds of formula I preferably is between about 0.02 and 3.0% by weight based on the monomer employed. The addition of a special oxidation component is not required. However, the addition of an accelerator is advantageous.

The most useful accelerators include copper, cuprous and cupric compounds such as cupric acetate, cupric acetylacetone, cuprous chloride, cupric chloride, cupric fluoride, cupric bromide, cupric nitrate, cuprous rhodanide, cupric sulfate, copper chromite, copper ferrocyanide, cuprous oxide and cupric oxide. Additionally, compounds of silver, cobalt, manganese, nickel, vanadium, chromium, molybdenum, mercury, iron, borine, bismuth, praseodymium, zinc, selenium and titanium are useful.

The polymerization products are utilized immediately for the preparation of thin coatings. For example, metals, such as iron, steel, aluminum, copper, concrete, glass, wood and other substances may be coated thereby. These polymerization products may also serve for the preparation of permanent street markings, foundation surfacers, joint sealing compounds and adhesives. They have the advantage that they have a surface completely free of tackiness, something which in many instances, e.g. in the preparation of street markings, is of great importance.

Example 4

To a 2 liter polymerization vessel equipped with stirrer, reflux condenser, thermometer, three inlets and a water bath, 1 liter of deionized water, 0.1 ml. of a 0.001% CuSO₄ solution, 0.5 g. NaCl and 100 g. acrylonitrile are added. The mixture is heated to 50° C. with the introduction of a weak nitrogen stream. Upon achieving this temperature in about 15 minutes and from separate dropping funnels, there is added dropwise 48 ml. of a 0.5% aqueous solution of potassium peroxy disulfate and 48 ml. of a 1.0% aqueous solution of a compound of the formula

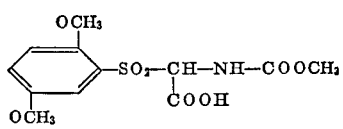

Polymerization sets in after about 10 minutes and the temperature rises to 55–57° C. In the course of one hour, 100 g. additional acrylonitrile as well as 112 ml. of a 0.5% aqueous solution of potassium peroxy disulfate and 112 ml. of a 1.0% aqueous solution of a compound of the formula given above are added dropwise. Upon reaction completion, stirring is continued for one hour at 70° C.

The polymer obtained after filtering off and drying has a K value of 105.

Example 5

To a cylindrical reaction vessel of polypropylene, 750 ml. deionized water are added and then, while stirring, there are dissolved 250 g. acrylamide, 0.85 g. 50% NaOH, 0.5 g. dibutylaminohydrochloride, 0.25 ml. of a CuSO₄ solution which contains in 1 ml. 30γ Cu⁺⁺, 0.25 g. ammonium peroxy disulfate and 0.25 g. of a compound of the formula

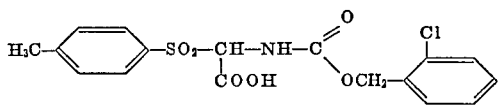

After displacing the air by the introduction of nitrogen, the reaction mixture polymerizes without mechanical intermixing at a starting temperature of 20° C. The temperature rises to 93° C. in the course of one hour. The polymer precipitates as a non-flowable gel. The viscosity ($\eta_{rel}$) was determined in 1 N. NaNO₃ at a 0.05% concentration at 25±0.1° C. to be 1.64.

The product is completely water soluble and is exceedingly suitable as a flocculation and sedimentation aid.

Example 6

In a 2 liter VA autoclave, a composition of 250 ml. deionized water, 5 g. Mersolate H, 1.5 g. disodium phosphate and 1.5 g. trisodium phosphate was added. Upon addition of 1.0 ml. of a 0.001% CuCl₂ solution as well as 1.0 g. of a compound of the formula

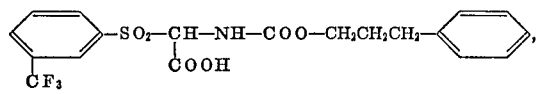

the air was removed by multiple evacuation and flushing with nitrogen. Ethylene was then introduced at 60° C. up to a saturation pressure of 160 atm., and then in the course of 2 hours, a solution of 1.0 g. tert. butylperpivalate in 100 ml. acetic ester was added.

After 4 hours reaction time, the composition was cooled to room temperature and the pressure was released. A pulverulent white polymer (74 g.) was obtained. The product had a molecular weight of 55,000.

Examples 7–14 relate to the preparation of decorative and/or protective coatings.

Example 7

Into a test tube were introduced 2 g. methacrylic acid methylester, 0.1 ml. of a methanolic accelerator solution with a content of 0.3 mg. cupric chloride dihydrate and 2 mg. dibutylaminohydrochloride and 0.1 g. of the catalyst

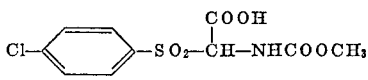

Then 1 g. polymeric methacrylic acid methylester is added in the form of bubbles. The reaction mixture is stirred for several seconds and then applied to a glass plate at a thickness of 1.8 mm. Upon cooling (about 35 minutes), the colorless polymer coating is free of tackiness.

If instead of cupric chloride dihydrate, other metal compounds are used in the same amount for the preparation of the accelerator solution (or suspension), similar results are obtained.

Example 8

A polyester is prepared in the following way:

| | G. |
|---|---|
| 1,2 propylene glycol | 30 |
| Maleic acid anhydride | 23 |
| Phthalic acid anhydride | 17 | are condensed at a temperature of 180–190° C. for eight hours in the presence of a trace of hydroquinone. Then the whole is cooled to 120° C. and 30 g. methylmethacrylate are introduced while stirring. After further cooling down to room temperature, the said polyester is obtained having an acid number of 18 and an OH number of 20. Of this polyester there are introduced 15 g. into a beaker and 0.5 g. of the catalyst

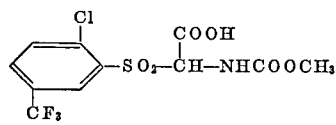

and 0.5 ml. commercial octa-soligen-cobalt-6-solution with 6% cobalt are stirred in as an accelerator solution, and subsequently a 2.0 mm. thick layer is applied onto a glass plate. The layer thus obtained is polymerized after about 1¾ hours and is free of tackiness.

In comparison thereto, the polymerization with benzoyl peroxide and octa-soligen-cobalt-6-solution required about 5 days to yield a non-tacky surface.

Example 9

If as the accelerator solution, instead of the octa-soligen-cobalt-6-solution of Example 8, one uses a solution of 0.1 g. commercial cobalt naphthenate paste with 12% cobalt in 0.4 ml. methylmethacrylate and proceeds as in Example 8, a practically non-tacky layer is obtained in about 3 hours.

In comparison thereto, polymerization with benzoyl peroxide and cobalt naphthenate required two days to yield a non-tacky surface.

Example 10

If one uses as a catalyst, instead of that described in Example 7, 0.1 g. of

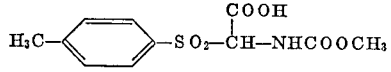

and otherwise proceeds as described in Example 7, there is obtained in about 40 minutes a colorless, non-tacky polymer.

Example 11

If one uses as a catalyst, instead of that described in Example 7, 0.1 g. of

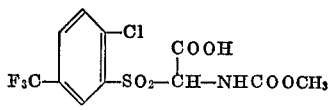

and otherwise proceeds as described in Example 7, after one hour there is obtained a colorless, non-tacky polymer.

Example 12

If one uses as a catalyst, instead of that described in Example 7, 0.1 g. of

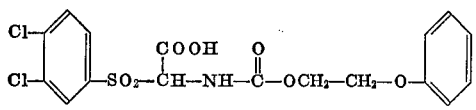

and otherwise proceeds as described in Example 7, there is obtained in about 50 minutes a colorless, non-tacky polymer.

Example 13

Into a beaker are introduced 15 g. unsaturated styrene-containing polyester (Roskydal 500B of the company Farbenfabriken Bayer AG), 0.5 g. of

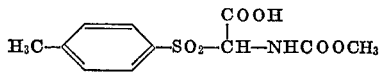

and as an accelerator solution, 0.5 ml. octa-soligen-cobalt-6-solution with 6% cobalt. The reaction mixture is stirred well and subsequently a 0.15 mm. thick film is applied onto a glass plate. The film thus obtained is non-tacky after one hour.

Example 14

Into a test tube are introduced 2 g. of finely pulverized methacrylic acid methyl ester, 0.1 ml. of a methanolic accelerator solution with a content of 0.3 mg. cupric chloride dihydrate and 2 mg. sodium bromide and 0.05 g. of the catalyst

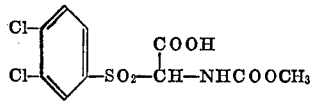

Then is added 1 g. polymeric methacrylic acid methyl ester (bead material of the company Kulzer, Bad Homburg v.d.H.). The reaction mixture is then stirred several seconds and then applied to an aluminum sheet in a layer about 1.4 mm. thick. Upon cooling, a colorless, non-tacky polymer results.

Similar results are obtained if other salts are used in the same amount instead of sodium bromide for the preparation of the accelerator solution (or suspension).

Particularly well suited are alkali metal and ammonium salts such as lithium chloride, sodium chloride, sodium iodide, sodium cyanide, potassium chloride, potassium bromide, potassium iodide, potassium permanganate, potassium rhodanide, potassium fluoride, rubidium carbonate, ammonium acetate, ammonium carbonate, ammonium hydrocarbonate, ammonium formate and ammonium sulfate.

We claim:

1. A compound selected from the group consisting of those of the formula

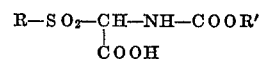

and their base addition salts wherein R and R' are alkyl having 1 to 6 carbon atoms, cycloalkyl having 3 to 8 carbon atoms, alkenyl having 2 to 6 carbon atoms, alkinyl having 2 to 6 carbon atoms, phenyl, naphthyl, benzyl, phenethyl, phenpropyl, phenoxyethyl or one of said moieties substituted by alkyl or alkoxy having 1 to 4 carbon atoms, alkenyl or alkinyl having 2 to 4 carbon atoms, chlorine, bromine, fluorine, nitro, hydroxy, trifluoromethyl or trifluoromethyloxy.

2. The compounds of claim 1 wherein at least one of R and R' is alkyl having 1 to 6 carbon atoms.

3. The compounds of claim 1 wherein at least one of R and R' is cycloalkyl having 3 to 8 carbon atoms.

4. The compounds of claim 1 wherein at least one of R and R' is phenyl.

5. The compounds of claim 1 wherein at least one of R and R' is naphthyl.

6. The compound of claim 1 wherein R is p-methylphenyl and R' is methyl.

References Cited

Dubina et al.: Ukir. Khim. Zh 33 (12), 1290–5 (1967).

LORRAINE A. WEINBERGER, Primary Examiner

P. J. KILLOS, Assistant Examiner

U.S. Cl. X.R.

260—75 A, 88.7 C, 89.5 A, 89.7 R, 94.9 B, 294.8 E, 326.3, 332.2 A, 438.1, 465 D, 465.4, 470, 479 C, 481 C